United States Patent Office 3,645,973
Patented Feb. 29, 1972

3,645,973
WATER-SOLUBLE SURFACE-ACTIVE CONDENSATION PRODUCTS [AND THE PRODUCTS THEREOF] FROM AMINOPLAST, ALCOHOL OR CARBOXYLIC ACID, POLYOL, AND SALT OF SULFUR CONTAINING ACID
Luzius Schibler, Riehen, Switzerland, assignor to Ciba Limited, Basel, Switzerland
No Drawing. Continuation of application Ser. No. 757,458, which is a continuation-in-part of application Ser. No. 527,491, Feb. 15, 1966. This application June 4, 1970, Ser. No. 41,773
Claims priority, application Switzerland, Mar. 9, 1965, 3,257/65
Int. Cl. C08g 9/24
U.S. Cl. 260—67.6 R                7 Claims

ABSTRACT OF THE DISCLOSURE

Water-soluble surface-active condensation products from aminoplast precondensates, containing radicals of mono-hydroxy compounds, radicals of alcohols containing at least 2 hydroxyl groups and Me—O$_3$S groups, where Me represents an alkali metal. These condensation products display a pronounced surface activity and act as lathering agents, detergents, emulsifiers and dispersants.

CROSS-REFERENCE

This application is a continuation of application Ser. No. 757,458 filed Sept. 4, 1968, now abandoned, which is a continuation-in-part of application Ser. No. 527,491, filed Feb. 15, 1966, now abandoned.

It has been found that valuable water-soluble surface-active condensation products are obtained by reacting (a) Aminoplast precondensates containing methylol groups or their ethers with alcohols containing at most 3 carbon atoms, (b) Monohydroxy compounds selected from the group consisting of an alkanol, an arylalcohol, an alkylcarboxylic acid, an alkylcarbamidomethylol, each compound containing at least 5 carbon atoms, and n-butanol, (c) Alcohols containing at least 2 hydroxyl groups and (d) A member selected from the group consisting of water-soluble alkali metal salt of sulfurous acid and of hydroxymethanesulfonic acid.

It is known that methylol compounds of urea or of melamine can be converted by a suitable etherification into surface-active compounds containing both hydrophobic and hydrophilic groups, that is to say groups that impart solubility in water. Such molecules contain, for example, on the one hand residues of monoalcohols containing more than 4 carbon atoms and on the other hand polyglycol ether residues, the monohydroxy compound constituting the hydrophobic part and the polyglycol ether the hydrophilic part of the molecule. Quite generally, such compounds correspond to the formula (1)     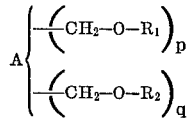

where A represents an aminoplast residue, for example urea or melamine; $R_1$ represents the residue of a monohydroxy compound containing more than 4 carbon atoms, and $R_2$ represents the residue of a polyglycol ether; $p$ and $q$ are whole numbers whose sum in the case of urea is 2 and in the case of melamine may be at most 6. Since in view of the tendency to the occurrence of side reactions, that is to say the formation of ether bridges ($CH_2OCH_2$—)

or methylene bridges ($CH_2$—) between two aminoplast molecules the simple, monomolecular compounds are difficult to produce, the numbers $p$ and $q$ will not reach the theoretical possible maximum values, that is to say there are obtained large molecules that can undergo cross-linking within themselves and may have the character of resins.

It is further known to introduce sulphonic acid groups or —SO$_3$Na groups in urea or melamine resins by reaction with salts of sulphurous acid. The products thus obtained display an enhanced solubility in water and are particularly suitable for use as adhesives. Since they contain no hydrophobic groups, they have no pronounced surface activity.

It is further known that aminoplast precondensates which have methylol groups etherified with lower aliphatic monohydric alcohols such as methanol, ethanol, iso-propanol, secondary and tertiary butanol, and dihydric alcohols, such as ethyleneglycol, diethyleneglycol or propyleneglycol, can be reacted in aqueous alkaline solution with alkali metal salts of sulfurous acid. The resulting resins however are not surface active, not hydrophobic and insoluble in organic solvents. They can be made hydrophobic only by prolonged heating, which causes an irreversible crosslinking of the resin. As these known products do not have hydrophobic and hydrophilic properties at the same time, they are not tensides.

However, urea-formaldehyde compounds etherified with higher alcohols have already been reacted with salts of sulphurous acid, whereby water-soluble, surface-active polymers suitable for use as detergents were obtained. The reaction consists in heating the hydrophobic resin with sodium meta-bisulphite for a prolonged period; the water present must be removed by azeotropic distillation and any free higher alcohol by steam distillation.

Like these above-mentioned known products the new condensation products obtained by the process referred to above may be used, for example, as detergents. Compared with the known products they are unexpectedly easy to manufacture. They are soluble in water and reduce its surface tension, which makes them suitable for the above-mentioned use and also as dispersants and emulsifiers. Since they owe their solubility in water to the sulphonate groups present in the molecule, they are anionic compounds.

The new products are advantageously manufactured by reacting aminoplast precondensates containing methylol groups, which are etherified on the one hand with monohydroxy compounds comprising at least 4 carbon atoms and on the other hand with alcohols comprising at least 2 hydroxyl groups, with water-soluble inorganic derivatives of sulphurous acid or with salts of hydroxymethanesulphonic acid. In general it is advantageous to perform in the manufacture of the ethers first the etherification with the monohydroxy of the ethers first the etherification with the monohydroxy compound and then only the etherification with the alcohol containing at least 2 hydroxyl groups.

The monohydroxy compounds containing at least 5 carbon atoms, which are used for the etherification of the methylol compounds, constitute the hydrophobic residue, as is the case to a certain degree already with n-butanol. Preferred use is made of monohydroxy compounds, such as alkanols, alkylaryl alcohols and alkyl carboxylic acids containing at least 5 carbon atoms and n-butanol. Suitable aminoplast precondensates—that is to say non-monomolecular products—are, for example, the methylol compounds of thiourea, biuret, acetylenediurea, ammeline or benzoguanamine. Preferred use is made of the methylol compounds of urea and of melamine; products containing a maximum amount of methylol groups generally furnish particularly valuable results. Instead of the free methylol groups there may be present methylol groups etherified with alcohols containing at most 3 carbon atoms, especially methylmethylol groups.

If by etherification of the methylol groups, or by transetherification of lower ethers by means of n-butanol, residues have been introduced which, as such, already have a distinctly hydrophobic character, the desired effect can be intensified by hydrophobic residues containing more than 4 carbon atoms. Thus, the n-butanol residues already present in the molecule, may be partially replaced by etherification by higher residues, for example those of n-octanol, lauryl alcohol or octadecyl alcohol or mixtures of such alcohols so that the product contains as residues of monohydroxyl compounds with at least 5 carbon atoms the residues of alkanols containing 5 to 18 carbon atoms. Further monohydroxyl compounds suitable in this connection are benzyl alcohol, hydroxybenzenes or hydroxynaphthalene, and more especially the known hydroxyalkylbenzenes such as 1 - hydroxy - 4-nonylbenzene or -tertiary butylbenzene; furthermore alicyclic monohydroxy compounds such as hydroabietyl alcohol. The molecule chain of the hydroxy compound may also be interrupted by nitrogen atoms as is the case, for example, with stearic acid methylolamide. Instead of the alcohols there may be used as monohydroxy compounds the corresponding monocarboxylic acids for the reaction with the (possibly etherified) methylol compounds, whereby products containing carboxylic acid ester groups are obtained. As relevant examples there may be mentioned oleic acid, coconut oil fatty acid and stearic acid. Preferred monohydroxy compounds are, beside n-butanol, 2-ethylhexanol, hydroabietylalcohol, coconut oil fatty acid, stearic acid, palmitic acid and especially lauryl alcohol, stearyl alcohol and nonylphenol.

The etherification of the urea-formaldehyde or melamine-formaldehyde compound with the hydrophobic hydroxy compound is best achieved, when n-butanol is used, directly in an excess of this alcohol, while maintaining the reaction at a slightly acid pH and removing the water present or liberated during the etherification by azeotropic distillation. The introduction of components of a stronger hydrophobic character, for example stearic acid, lauryl alcohol or alkylphenol, is preferably carried out by replacing the n-butanol residues in the butyl ethers which are readily accessible in a more or less high-molecular form as the so-called lacquer resins.

The residues of alcohol containing at least 2 hydroxyl groups may likewise be introduced by transetherification, using—as with the monohydroxy compounds—the butyl ethers or the methyl or ethyl ethers of the methylol compounds. As compounds containing at least 2 hydroxyl groups there may be mentioned glycerol, propanediol, erythritol and pentanediol and especially compounds of the formula (2) $\quad H{+}O{-}CH_2{-}CH_2{\}}_mOH$

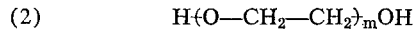

where $m$ is a whole number not exceeding 25, for example ethyleneglycol, diethyleneglycol and the so-called polyols having a molecular weight of up to about 600. These compounds, which contain at least two hydroxyl groups and are thus hydrophilic, may be introduced into the molecule before, simultaneously with or after the monohydroxy compounds. Alternatively, a mixture of two or more than two hydrophilic dihydroxy or polyhydroxy compounds may be used, and the total amount of these mixture constituents is always selected so that the mixed ethers are hydrophilic but not soluble in water. To satisfy this condition the hydrophilic component should constitute at least about 10% and at most about 45% of the condensation product as a whole, that is to say that the proportion of the alcohol containing at least 2 hydroxyl groups, used as a condensation component, should be at a ratio of at least 1:9 and of at most 9:11 to the remainder of the condensation product.

The mixed ethers manufactured in this manner are then reacted with water-soluble inorganic derivatives of sulphurous acid or with salts of hydroxymethanesulphonic acid. For this purpose there may be used the compounds of the formula (3a) 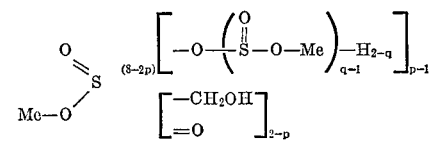

or (3b) $\quad Me_nH_{2-n}S_nO_{2n+1}$

where $n$, $p$ and $q$ each $=1$ or 2, $(8-2p)$ is the valence of sulphur and Me represents an alkali metal, especially the sodium salts, for example sodium bisulphite or sodium metabisulphite. Likewise suitable are alkali metal hydromethanesulphonates, especially the sodium compound which is very easy to manufacture from sodium bisulphite and formaldehyde:

(4) $\quad NaHSO_3+CH_2O \rightarrow HO{-}CH_2{-}SO_3Na$

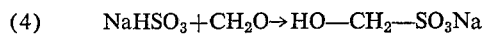

The formaldehyde may be liberated from the aminoplast precondensate.

The reaction with the water-soluble sulphur compound of the Formula 3 is best carried out in an anhydrous slightly acidic medium at a temperature within the range from 80 to 130° C., that is to say under conditions so mild that no disturbing side reactions can intervene. The proportions cannot be determined stoichiometrically. The best plan is to determine the necessary amount of the water-soluble sulphur compound of the Formula 3 empirically. An excess is harmless since in most cases it is easy to remove from the reaction product; for this purpose the reaction product is stirred, if necessary repeatedly, with an equal quantity of water, whereupon all water-soluble salts and the free formaldehyde dissolve. As a rule it is easy to free the salt solutions from the viscid, resinous reaction products. If necessary, the reaction product is mixed with a quantity of an alkaline substance sufficient to reach a pH value from 7.0 to 8.0.

The condensation products obtained by the present process dissolve in much water to form clear to weakly turbid colloidal solutions. This property materializes only on reaction with the derivatives of sulphurous acid or with the salts of hydroxymethanesulphonic acid. The condensation products display a pronounced surface activity and, depending on the type and amount of the components, they act as lathering agents, detergents, emulsifiers and dispersants.

Unless otherwise indicated parts and percentages in the following examples are by weight. The term butanol always stands for n-butanol.

EXAMPLE 1

A mixture of 206 parts of aqueous formaldehyde of 36.5% strength, 170 parts of butanol and 60 parts of urea is mixed with 8 parts of ammonia of 25% strength, and the whole is heated in a stirring flask equipped with a descending condenser for 2 hours at 96° C., during which a total of 32 parts of a mixture of butanol and water pass over. The reaction mixture is then cooled to about 50° C. and a solution of 1 parts of phosphoric acid of 85% strength in 20 parts of butanol is added. The whole is then heated under vacuum to 80° C., with water and butanol passing over. The water is separated from the distillate, whereas the butanol flows back into the reaction vessel. After about 4 hours the product is substantially anhydrous and can be mixed with benzene in any desired proportion.

If the phosphoric acid present were neutralized with about 5 parts of triethanolamine and the resulting product concentrated to about 212 parts by weight, the material referred to as "urea-butanol lacquer resin" in the following examples would be obtained.

Instead, 31 parts of lauryl alcohol and 44 parts of ethyleneglycol are added to the above batch and the mixture is heated in vacuum once more to 80° C., with 100 parts of butanol distilling off. 50 parts of dry sodium hydroxymethanesulphonate (prepared from sodium bisulphite and formaldehyde by evaporation and drying) are then added and the mixture is stirred for a few minutes longer at 80° C. until the reaction product has become soluble in water. The condensation is discontinued by stirring in 8 parts of triethanolamine and the whole is cooled, to yield 290 parts of a viscous, colourless substance which is vigorously stirred with an equal quantity of water. The resulting water-in-oil emulsion separates on standing to form two layers. The salt solution is decanted, to leave a transparent resin which is readily soluble in water. Its strongly lathering solutions may be used as detergent and cleanser.

When 1 to 5 g. of the substance thus obtained are dissolved in 1 litre of desalted water and the solution is used for washing crude wool at a goods-to-liquor ratio of 1:50 by moving the wool about in the liquor for 30 minutes at 60° C., the dirt is removed from the wool which is distinctly brighter after this treatment.

A similar result is obtained by using instead of lauryl alcohol 2-ethylhexanol-(1) or nonylphenol or by replacing sodium hydroxymethanesulphonate by dry sodium bisulphite.

EXAMPLE 2

20 parts of ethyleneglycol and 3 parts of glacial acetic acid are added to 159 parts of the urea-butanol lacquer resin described in Example 1 and the whole is heated under vacuum to 80° C., during which 35 parts of butanol pass over, to leave a viscous, clear, transparent resin which contains both butanol and glycol ether groups and is soluble in butanol but not in water. 20 parts of sodium metabisulphite are added and the mixture is stirred for 1 hour, during which the temperature is raised from 90° C. to 115° C. When a specimen of the reaction product has become readily soluble in water, 8 parts of triethanolamine are added and the whole is cooled to room temperature, to yield 175 parts of a viscid, resinous substance which is easy to extract with a small amount of water. Both the original product and the extracted product, which contains little salt but in its place some water, dissolve in much water to form clear, lathering solutions.

EXAMPLE 3

159 parts of the urea-butanol resin described in Example 1 are mixed with 22 parts of nonylphenol, 31 parts of ethyleneglycol and 3 parts of glacial acetic acid, whereupon 48 parts of butanol are distilled off under vacuum. 38 parts of sodium metabisulphite and 12 parts of paraformaldehyde are then added, and the whole is heated for 1½ hours at 100 to 124° C. until the product readily forms a clear solution in water. The reaction product is neutralized with 7.5 parts of triethanolamine, stirred and cooled, to yield 224 parts of a viscous substance which is twice stirred with an equal quantity of water, and the aqueous salt solution is then decanted. Finally, a water-in-resin emulsion of about 50% dry content results which forms in much water readily clear, strongly lathering solutions.

EXAMPLE 4

A mixture of 159 parts of the urea-butanol resin (described in Example 1), 28 parts of n-octadecyl alcohol, 69 parts of glycerol and 3 parts of glacial acetic acid is heated under vacuum to 80 to 90° C., during which 50 parts of butanol pass over. The residue is mixed with 52 parts of sodium bisulphite and 15 parts of paraformaldehyde and the batch is gradually heated within one hour to 113° C. When the reaction product forms in water a clear, strongly lathering solution, 12.5 parts of triethanolamine are added, and the whole is stirred and cooled to room temperature, to yield 188 parts of a viscid substance from which the bulk of its salt content is easy to extract by stirring with an equal quantity of water, whereupon it can be isolated. The residue forms a white paste which dissolves readily in 300 to 500 times its own weight of water. The solutions may be used for washing textile materials. Similar good results are obtained when sodium sulphite alone is used instead of sodium bisulphite and paraformaldehyde.

EXAMPLE 5

A mixture of 150 parts of urea-butanol lacquer resin described in Example 1, 25 parts of coconut oily fatty acid, 50 parts of diethyleneglycol and 3 parts of glacial acetic acid is distilled under vacuum until 40 g. of butanol have passed over. The residue is mixed with 50 parts of dry sodium hydroxymethanesulphonate

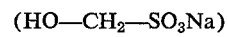
(HO—CH$_2$—SO$_3$Na)

In the course of 20 minutes the temperature is then raised from 90° to 107° C., whereupon the product has become soluble in water; it is stirred with 12.5 parts of triethanolamine and allowed to cool. Yield: 250 parts of a viscous reaction product from which on standing excess salt settles out on the bottom and the supernatant substance turns completely clear and transparent. Alternatively, the salt may be removed by repeated agitation with water, in which case a stable water-on-oil emulsion is left behind. In much water the product dissolves readily to form a solution which has outstanding washing and emulsifying capacity.

EXAMPLE 6

A mixture of 126 parts of melamine and 18 parts of ammonia of 25% strength is dissolved in 590 parts of 36.5% methanol-containing aqueous formaldehyde at 60° C. The batch is heated to 80° C. and in the course of about 20 minutes 132 parts of a mixture of methanol and water are distilled off under vacuum. 490 parts of butanol are then added and the mixture is further distilled under vacuum, while separating the mixture of water and butanol which passes over. The butanol returns to the reaction vessel, while 118 parts of an aqueous layer separate. 3 parts of formic acid of 85% dissolves in 5 parts of butanol are added and a total of 452 parts of butanol is distilled off which entrains the last remnants of water, to yield 532 parts of a viscous, colourless resin which is miscible with benzene in any desired proportion. In the following examples this product is referred to as "melamine-butanol lacquer resin."

The above batch is mixed with 333 parts of polyglycol of molecular weight 300 and 3 parts of glacial acetic acid and the whole is heated under vacuum to 80° C., with another 133 parts of butanol distilling off, to yield 735 parts of a hydrophilized but still not water-soluble resin which contains butanol residues as well as polyglycol ether groups. When this product is heated for 45 minutes at 90° C. with 130 parts of sodium bisulphite and 37 parts of paraformaldehyde, it becomes water-soluble. Water in several small portions is then added and the mixture is stirred on each occasion, whereby triethanolamine acetate, hexamethylene-tetramine, excess sodium bisulphite and other readily soluble constituents are extracted and can be separated. The residue, which still contains some water, forms a viscous, white paste (water-in-oil emulsion) which readily dissolves in much water to form strongly lathering solutions.

Similar good results are obtained when sodium bisulphite alone is used instead of sodium bisulphite and paraformaldehyde.

EXAMPLE 7

160 parts of the melamine-butanol lacquer resin described in Example 6 are mixed with 28 parts of lauryl alcohol, 106 parts of diethyleneglycol and 3 parts of glacial acetic acid, whereupon 35 parts of butanol are distilled off under vacuum at 80 to 90° C., to yield a homogeneous, water-insoluble resin modified with lauryl alcohol and diethyleneglycol. 39 parts of dry sodium bisulphite and 11 parts of paraformaldehyde are added and the mixture is heated within one hour from 93° to 108° C. When the reaction product has become soluble in water, it is stirred with 12 parts of triethanolamine and cooled to yield 324 parts of a viscid, transparent, resinous product which dissolves in much water. Its clear, lathering solutions may be used for washing textile materials.

A similar result is obtained by using hydroabietyl alcohol instead of lauryl alcohol, or sodium bisulphite alone instead of sodium bisulphite and paraformaldehyde.

EXAMPLE 8

A mixture of 160 parts of the melamine-butanol lacquer resin of Example 6, 28 parts of stearic acid, 100 parts of polyglycol of molecular weight 600 and 3 parts of glacial acetic acid is heated under vacuum to 80° C., during which 40 parts of butanol pass over, to leave as residue a homogeneous, viscid resin which is mixed with 26 parts of solid sodium bisulphite and heated within 20 minutes from 95° to 107° C., whereupon the product has become water-soluble. 12 grams of triethanolamine are added, the mixture is stirred and then cooled, to yield a gelatinous resin which forms a clear solution in much water.

EXAMPLE 9

A mixture of 180 parts of aqueous formaldehyde of 36.5% strength, 60 parts of urea, 148 parts of butanol, 18 parts of xylene and 7 parts of ammonia of 25% strength is refluxed for one hour at 90 to 100° C. A mixture of 1 part of phosphoric acid of 85% strength and 9 parts of butanol is then added and the whole is heated under vacuum to 75° C., during which water, xylene and butanol pass over. The water is separated in a receptacle, whereas the organic solvents flow back into the reaction vessel. When water no longer passes over, 74 parts of lauryl alcohol and 28 parts of ethyleneglycol are added, and the whole is refluxed for one hour and then 70 parts of butanol and xylene are distilled off under vacuum at 90° C. 20 parts of finely powdered sodium metabisulphite ($Na_2S_2O_5$) are then added, and the whole is stirred for 50 minutes at 85° C. until the reaction product has become soluble in water. It is stirred with 5 parts of triethanolamine and the whole is kept for 24 hours at 50° C. The suspended salt collects on the bottom of the vessel and there is obtained as the supernatant layer 300 parts of a clear, transparent, viscous resin which readily forms strongly lathering solutions in water.

2 parts of the above product are dissolved in 998 parts of water and the resulting solution is used for washing a dirty cotton fabric by moving it about at a goods-to-liquor ratio of 1:40 for 30 minutes in the washing liquor which during this time is raised to the boil. The washed fabric displays a distinct cleaning effect.

A similar product is obtained when 2-ethylhexanol-(1) is used instead of lauryl alcohol.

EXAMPLE 10

150 parts of the urea-butanol lacquer resin mentioned in Example 1 are mixed with 25 parts of plamitic acid, 40 parts of diethyleneglycol and 3 parts of glacial acetic acid and heated under vacuum to 80° C., during which 38 parts of butanol pass over. 20 parts of sodium metabisulphite ($Na_2S_2O_5$) are then added and the whole is stirred on for 20 minutes at 92° C., finally neutralized with 3 parts of triethanolamine or 1.7 parts of morpholine, and cooled. If the viscous, still turbid product is dissolved in twice its own weight of toluene, the salt is filtered off and the solvent once more expelled under vacuum, a clear, transparent resin is obtained which readily dissolved in water. The opalescent, strongly lathering solutions may be used for washing textile fibres or fabrics.

EXAMPLE 11

195 parts of a highly condensed hexamethylolmelamine methyl ether are mixed with 37 parts of lauryl alcohol and 106 parts of diethyleneglycol, and 35 parts of water and methanol are distilled out of this mixture under vacuum. 1 part of glacial acetic acid is then added and the whole is heated for 30 minutes at 95° C. and the reaction product is allowed to cool, whereupon it remains clear and homogeneous. After addition of 20 parts of solid sodium metabisulphite the batch is heated for another 15 minutes at 95° C., whereupon the reaction product readily dissolves in water to form faintly turbid, distinctly lathering solutions.

What is claimed is:

1. A water-soluble surface-active anionic condensation product obtained by reacting at a temperature within the range from 80 to 130° C. about 30–60 parts of an aminoplast precondensate selected from the group consisting of the methylol compounds of thiourea, biuret, acetylenediurea, ammeline, benzoguanamine, urea and melamine with
    (1) 5–25 parts of a member selected from the group consisting of an alkanol, an aryl alcohol, an alkylcarboxylic acid, each alkyl radical containing at least 5 carbon atoms, and n-butanol,
    (2) 10–45 parts of a member selected from the group consisting of glycerol, propanediol, erythritol, pentanediol and a glycol of the formula $$H\text{+}O\text{—}CH_2CH_2\text{+}_mOH$$

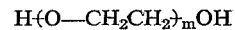

where $m$ is a whole number not exceeding 25, (1) and (2) being linked to the methylol groups, and
    (3) 5–25 parts of a member selected from the group consisting of water-soluble alkali metal salts of sulfurous acid and of hydroxymethanesulfonic acid, said salts being linked with carbon atoms of the methylol groups.

2. A water-soluble surface-active condensation product according to claim 1 wherein the aminoplast precondensate is selected from the group consisting of methylolurea and methylolmelamine.

3. A water-soluble surface-active condensation product according to claim 2 wherein the aminoplast precondensate is reacted with
    (1) a member selected from the group consisting of an alkanol containing 5 to 18 carbon atoms and n-butanol,
    (2) a member selected from the group consisting of glycerol, propanediol, erythritol, pentanediol and a glycol of the formula $H\text{+}O\text{—}CH_2CH_2\text{+}_mOH$, where $m$ is a whole number not exceeding 25, and
    (3) a member selected from the group consisting of water-soluble alkali metal salts of sulfurous acid and of hydroxymethanesulfonic acid, said salts being linked with carbon atoms of the methylol groups.

4. A water-soluble surface-active condensation product according to claim 2 wherein the aminoplast precondensate is reacted with
    (1) an alkanol containing 5 to 18 carbon atoms or n-butanol,
    (2) an alcohol of the formula $$H\text{+}O\text{—}CH_2\text{—}CH_2\text{+}_mOH$$

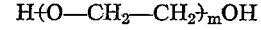

where $m$ is a whole number not exceeding 25, and
    (3) a member selected from the group consisting of water-soluble alkali metal salts of sulfurous acid and of hydroxymethanesulfonic acid, said salts being linked with carbon atoms of the methylol groups.

5. A water-soluble surface-active condensation product according to claim 2 wherein the aminoplast precondensate is reacted with (1) an alkanol containing 5 to 18 carbon atoms or n-butanol,
(2) an alcohol of the formula $$H(O-CH_2CH_2)_mOH$$

where $m$ is a whole number not exceeding 25, and
(3) a member selected from the group consisting of water-soluble sodium salts of sulfurous acid and of hydroxymethanesulfonic acid, said salts being linked with carbon atoms of the methylol groups.

6. A water-soluble surface-active condensation product according to claim 2 wherein the aminoplast precondensate is reacted with
(1) a member selected from the group consisting of lauryl alcohol, stearyl alcohol and nonylphenol,
(2) a member selected from the group consisting of ethyleneglycol and diethyleneglycol and
(3) a member selected from the group consisting of water-soluble sodium salts of sulfurous acid and of hydroxymethanesulfonic acid, said salts being linked with carbon atoms of the methylol groups.

7. A water-soluble surface-active condensation product according to claim 2 wherein the aminoplast precondensate is reacted with
(1) lauryl alcohol,
(2) ethyleneglycol, and
(3) a member selected from the group consisting of water-soluble sodium salts of sulfurous acid and of hydroxymethanesulfonic acid, said salts being linked with carbon atoms of the methylol groups.

References Cited
UNITED STATES PATENTS

| | | |
|---|---|---|
| 2,486,459 | 1/1946 | Bock. |
| 2,603,623 | 7/1952 | Bonzagni. |
| 2,690,434 | 9/1954 | Sellet et al. |
| 2,709,693 | 5/1955 | Widmer. |
| 3,310,416 | 2/1964 | Schibler. |
| 2,946,747 | 7/1960 | Kirkpatrick et al. ____ 252—855 |
| 3,284,187 | 11/1966 | Linder _____ 71—3 |

HAROLD D. ANDERSON, Primary Examiner

U.S. Cl. X.R.

8—137; 106—285; 252—152, 355; 260—21, 29.4 R, 67.6 C, 69 R, 69 F, 70 R, 70 A, 71